(12) United States Patent
Danilak

(10) Patent No.: US 10,037,158 B2
(45) Date of Patent: Jul. 31, 2018

(54) VERTICALLY INTEGRATED STORAGE

(71) Applicant: Skyera, LLC, San Jose, CA (US)

(72) Inventor: Radoslav Danilak, Cupertino, CA (US)

(73) Assignee: Skyera, LLC, San Jose, CA (US)

( * ) Notice: Subject to any disclaimer, the term of this patent is extended or adjusted under 35 U.S.C. 154(b) by 0 days.

(21) Appl. No.: 15/452,606

(22) Filed: Mar. 7, 2017

(65) Prior Publication Data

US 2017/0177252 A1   Jun. 22, 2017

Related U.S. Application Data

(63) Continuation of application No. 14/208,401, filed on Mar. 13, 2014, now Pat. No. 9,586,142.

(60) Provisional application No. 61/799,023, filed on Mar. 15, 2013, provisional application No. 61/798,754, filed on Mar. 15, 2013, provisional application No. 61/794,647, filed on Mar. 15, 2013, provisional application No. 61/788,613, filed on Mar. 15, 2013, provisional application No. 61/793,141, filed on Mar. 15, 2013, provisional application No. 61/793,591, filed on Mar. 15, 2013.

(51) Int. Cl.
G06F 13/12 (2006.01)
G06F 13/38 (2006.01)
G06F 13/36 (2006.01)
G06F 3/06 (2006.01)

(52) U.S. Cl.
CPC ............ G06F 3/0619 (2013.01); G06F 3/065 (2013.01); G06F 3/0641 (2013.01); G06F 3/0655 (2013.01); G06F 3/0688 (2013.01); G06F 3/0689 (2013.01)

(58) Field of Classification Search
CPC .... G06F 3/0689; G06F 11/703; G06F 13/385; G06F 11/1453; G06F 17/3015; G06F 17/30156
USPC .......................................................... 710/62
See application file for complete search history.

(56) References Cited

U.S. PATENT DOCUMENTS

| | | | |
|---|---|---|---|
| 7,506,215 B1 * | 3/2009 | Maw ................... | G06F 11/0751 709/224 |
| 7,529,784 B2 | 5/2009 | Kavuri et al. | |
| 7,620,775 B1 | 11/2009 | Waxman | |
| 7,849,241 B2 | 12/2010 | Gschwind et al. | |
| 8,732,403 B1 * | 5/2014 | Nayak ................... | G06F 3/0641 711/135 |

(Continued)

FOREIGN PATENT DOCUMENTS

| | | |
|---|---|---|
| WO | WO-2008/005212 A2 | 1/2008 |
| WO | WO-2014/144384 A | 9/2014 |

OTHER PUBLICATIONS

International Search Report issued by the Korean Intellectual Property Office as International Searching Authority for International Application No. PCT/US2014/028772 dated Jul. 11, 2014 (3 pages).

*Primary Examiner* — Farley Abad
*Assistant Examiner* — Getente A Yimer
(74) *Attorney, Agent, or Firm* — McDermott Will & Emery LLP

(57) ABSTRACT

Various systems, methods, apparatuses, and computer-readable media for accessing a storage device are described. Techniques are described for vertically integrating the various software functions and hardware functions for accessing storage hardware. In some embodiments, the system is implemented using non-volatile memory.

18 Claims, 5 Drawing Sheets

(56) References Cited

U.S. PATENT DOCUMENTS

| | | | |
|---|---|---|---|
| 2005/0226059 A1* | 10/2005 | Kavuri | G06F 3/0605 |
| | | | 365/189.05 |
| 2008/0005141 A1 | 1/2008 | Zheng et al. | |
| 2008/0034268 A1* | 2/2008 | Dodd | H03M 7/30 |
| | | | 714/755 |
| 2008/0120129 A1 | 5/2008 | Seubert et al. | |
| 2010/0332479 A1 | 12/2010 | Prahlad et al. | |
| 2011/0074464 A1* | 3/2011 | Gunaratna | H03K 17/005 |
| | | | 326/41 |
| 2011/0202722 A1 | 8/2011 | Satran et al. | |
| 2012/0005418 A1 | 1/2012 | Ribeiro et al. | |
| 2012/0016839 A1 | 1/2012 | Yueh | |
| 2012/0310890 A1* | 12/2012 | Dodd | G06F 11/1451 |
| | | | 707/646 |
| 2013/0262758 A1* | 10/2013 | Smith | G06F 3/0605 |
| | | | 711/112 |
| 2014/0281216 A1 | 9/2014 | Danilak | |

\* cited by examiner

VERTICALLY INTEGRATED STORAGE

CROSS-REFERENCE TO RELATED APPLICATIONS

This application claims the benefit of priority under 35 U.S.C. § 120 as a continuation of U.S. patent application Ser. No. 14/208,401, filed Mar. 13, 2014 and entitled "VERTICALLY INTEGRATED STORAGE," which claims benefit under 35 U.S.C. § 119(e) to U.S. Provisional Patent Application Ser. No. 61/799,023, filed Mar. 15, 2013 and entitled "VERTICALLY INTEGRATED STORAGE," U.S. Provisional Patent Application Ser. No. 61/798,754, filed Mar. 15, 2013 and entitled "HIGH DENSITY SERVER STORAGE UNIT," U.S. Provisional Patent Application Ser. No. 61/794,647, filed Mar. 15, 2013 and entitled "APPARATUS AND METHOD FOR TRANSLATION FROM MULTI-DIMENSIONAL TO LINEAR ADDRESS SPACE IN STORAGE," U.S. Provisional Patent Application Ser. No. 61/788,613, filed Mar. 15, 2013 and entitled "COMPRESSOR RESOURCES FOR HIGH DENSITY STORAGE UNITS," U.S. Provisional Patent Application Ser. No. 61/793,141, filed Mar. 15, 2013 and entitled "MASS STORAGE DEVICE AND METHOD OF OPERATING THE SAME TO BACK UP DATA STORED IN VOLATILE MEMORY," and U.S. Provisional Patent Application Ser. No. 61/793,591, filed Mar. 15, 2013 and entitled "MASS STORAGE DEVICE AND METHOD OF OPERATING THE SAME TO STORE PARITY DATA," which are incorporated by reference herein in their entirety for all purposes.

BACKGROUND

Aspects of the disclosure relate to computing and communication technologies. In particular, aspects of the disclosure relate to systems, methods, apparatuses, and computer-readable media for improving performance of storage devices.

Storage devices for enterprise systems require massive storage capacity. Additionally, storage solutions for enterprise systems require sophisticated storage systems for reliability, robustness, fault tolerance, maximizing storage capacity, minimizing power consumption, and reducing latency. Various storage industry players have specialized in specific aspects of these storage systems in a segmented manner providing piecemeal solutions. Combining these various segmented solutions results into a clunky storage solution that is less than the sum of its parts and significantly underperforms across the board.

The segmentation and underperformance of the available solutions today results in a significant deterrent in adaptation of newer storage technologies, such as solid-state devices (SSD). Traditionally, enterprise systems have been implemented using media such as hard disk drives (HDD) that retain data while the power is turned off. Hard disk drives are data storage devices, used for storing and retrieving digital information, that use rapidly rotating disks. An HDD consists of one or more rigid ("hard") rapidly rotating disks (platters) with magnetic heads arranged on a moving actuator arm to read and write data to the disk surfaces. Due to moving parts, HDDs are inherently slow in terms of servicing I/O operations compared to the number of storage access requests the processor running the software stack can service during the same time. In the past, since the HDDs were significantly slower than the processors, the inefficiencies in the software stack running on the processor were both hidden and non-consequential to the speed of the entire system. However, with newer technologies, such as SSDs, that can support higher throughput for I/O operations, the inefficiencies in the software architecture is becoming a limiting factor in the adaptation of such newer technologies.

Embodiments of the invention solve this and other problems.

BRIEF SUMMARY

Various systems, methods, apparatuses, and computer-readable media for accessing a storage medium are described. Techniques are described for vertically integrating the various functions for optimally accessing storage hardware.

According to some embodiments of the invention, an example storage device may include a storage medium comprising non-volatile memory, one or more processing entities configured to execute a deduplication module to detect duplicity of data, and execute a Redundant Array of Independent Disks (RAID) module to provide fault tolerance by spreading data and parity information across the non-volatile memory. The example storage device may be further configured to perform a journaling function using a journaling module only once for the deduplication module and the RAID module for an access request to the storage medium on the storage device, and perform a mapping function using a mapping module only once for the deduplication module and the RAID module for the access request to the storage medium on the storage device. In one embodiment, a flash translation layer (FTL) module may include the journaling module and the mapping module. In certain embodiments, the storage device may be configured to execute a single instance of the FTL module for the storage device.

In certain embodiments, the one or more processing units of the storage device may be further configured to execute a compression module for compressing data before storing the data on the storage medium and decompressing the data after retrieving the data from the storage medium, wherein the compression module does not have a separate journaling functionality or separate mapping functionality. In some embodiments, the one or more processing units of the storage device may be further configured to execute a snapshot and thin provisioning module, wherein the snapshot and thin provisioning module does not have a separate journaling functionality or separate mapping functionality.

In other embodiments, the one or more processing units of the storage device may be further configured to execute a File System (FS) module for providing abstraction to an application for storing, retrieving and updating files comprising data on the storage medium, wherein the FS module does not have a separate journaling functionality or separate mapping functionality. In yet other embodiments, the one or more processing units are further configured to execute an Operating System (OS) module configured to execute on one or more processors, wherein OS module does not have a separate journaling functionality or separate mapping functionality.

In some embodiments, the one or more processing units of the storage device may be further configured to perform a caching function using a caching module only once for the deduplication module and the RAID module for the access request to the storage medium on the storage device. In other embodiments, the one or more processing units are further configured to perform a garbage collection function using a garbage collection module only once for the deduplication module and the RAID module for the access request to the storage medium on the storage device.

In some embodiments, the mapping function by the mapping module may perform a translation from a linear address to a physical address for the access request to the storage device using a multidimensional mapping, wherein a first dimension of the multidimensional mapping is a file identifier and the second dimension of the multidimensional mapping is a snapshot version.

An example non-transitory computer readable storage medium may include instructions executable by a processor to manage access to the non-volatile memory for the storage medium using a Flash Translation Layer (FTL) module, detect duplicity of data using a deduplication module, provide fault tolerance by spreading data and parity information across the non-volatile memory using a Redundant Array of Independent Disks (RAID) module, perform a journaling function using a journaling module only once for the FTL module, the deduplication module and the RAID module for an access request to the storage medium on the storage device, and perform a mapping function using a mapping module only once for the FTL module, the deduplication module and the RAID module for the access request to the storage medium on the storage device. In some embodiments, the instructions are part of a single executable binary.

In certain embodiments, the non-transitory computer readable storage medium further includes instructions to compress data only once for a store access request and decompress data only once for a read access request. In other embodiments, the non-transitory computer readable storage medium further includes instructions to perform caching function only once for the access request to the storage medium on the storage device. In yet other embodiments, the non-transitory computer readable storage medium further includes instructions to perform garbage collection functionality only once for the access request to the storage medium on the storage device.

An example method for accessing a storage medium on a storage device may include managing access to the non-volatile memory for the storage medium using a Flash Translation Layer (FTL) module, detecting duplicity of data using a deduplication module, providing fault tolerance by spreading data and parity information across the non-volatile memory using a Redundant Array of Independent Disks (RAID) module, performing a journaling function only once using a journaling module for an access request to the storage medium on the storage device, and performing a mapping function only once using a mapping module only once for the access request to the storage medium on the storage device.

In certain example embodiments, the method further comprises compressing data only once if the access request is a store access request and decompressing data only if the access request is a read access request. In some embodiments, the method further includes performing caching only once for the access request to the storage medium on the storage device. In other embodiments, the method further includes performing garbage collection functionality only once for the access request to the storage medium on the storage device. In yet other embodiments, the method further includes performing garbage write combining only once for the access request to the storage medium on the storage device.

The foregoing has outlined rather broadly features and technical advantages of examples in order that the detailed description that follows can be better understood. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Features which are believed to be feature of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

Aspects of the disclosure are illustrated by way of example. In the accompanying figures, like reference numbers indicate similar elements, and.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Figure 1:
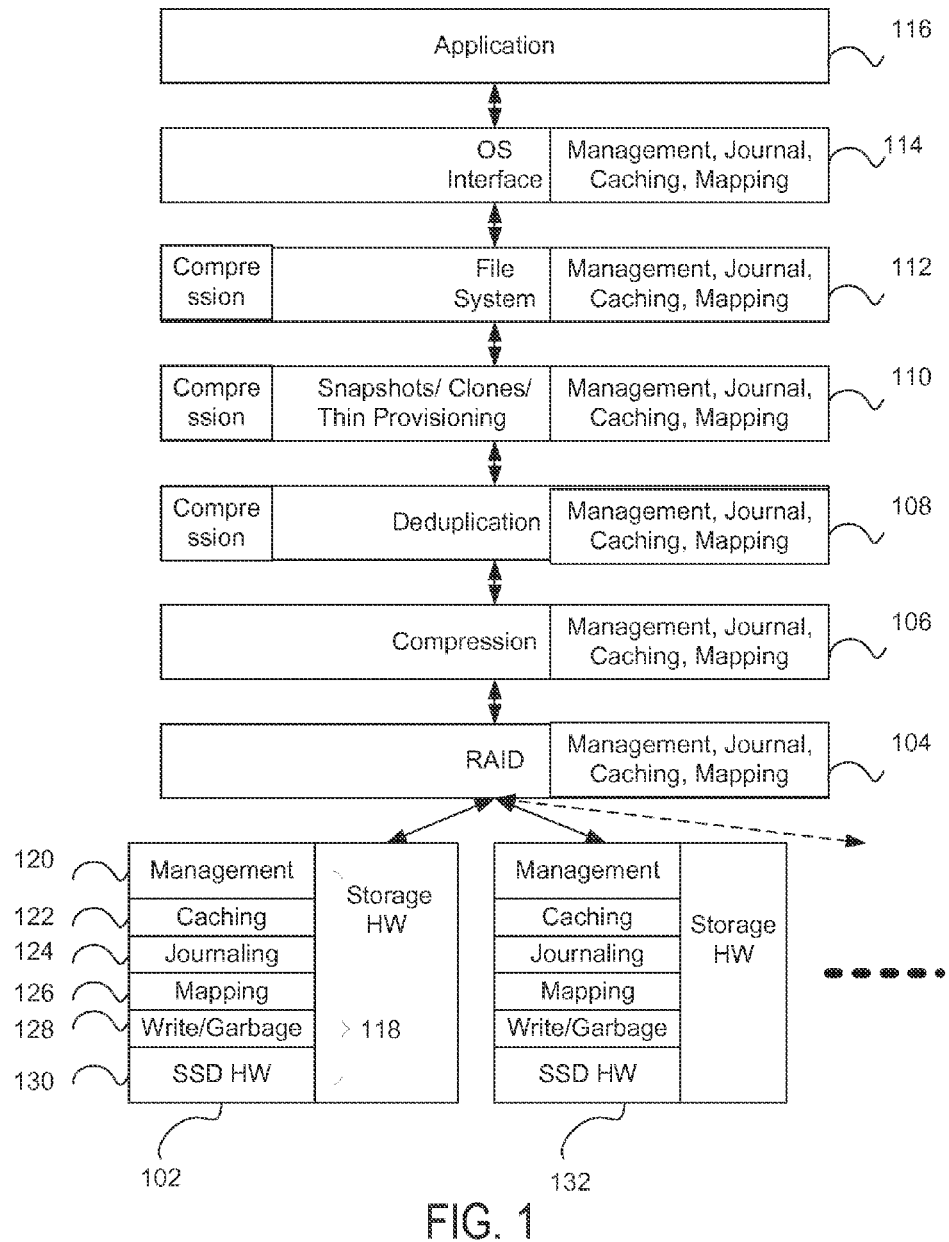
FIG. 1 illustrates a simplified diagram of a prior art segmented approach for accessing storage hardware.

FIG. 1 illustrates a simplified diagram of a segmented approach for accessing storage hardware. The segmented approach for storage devices uses a number of stacked software/firmware layers for accessing the storage hardware from the application layer 116. As shown in FIG. 1, in one implementation, the segmented approach includes the firmware 118 associated with the storage device, Redundant Array of Independent Disks (RAID) layer 104, compression layer 106, deduplication layer 108, snapshots/clones/thin provisioning layer 110, file system layer 112, OS interface layer 114, and application layer 116. The firmware interacting with the hardware may also act as another layer 102 implementing its own management 120, caching 122, journaling 124, mapping 126, and write/garbage collection 128. In some embodiments, the firmware 118 may be referred to as the Flash Translation Layer (FTL). The various layers in the stack may be developed by various storage device industry vendors.

In some traditional implementations, the storage hardware for the storage device may be implemented using several HDDs or SSDs such as 102 and 132, from FIG. 1. It should be noted that each of these HDDs or SSDs in prior art systems duplicate the management, caching, journaling, mapping, write/garbage and garbage collection, therefore running several instances of the same functionality. Furthermore, the management, caching, journaling, mapping, write/ garbage and garbage collection is internal to the HDDs or SSDs and the storage medium is accessible only through a standardized interface (e.g., SATA, or USB). Therefore, the upper software layers of the software implementing RAID, deduplication, compression, etc. do not have access to such functionality from the HDD or SSD and must duplicate such housekeeping functionality in the upper layers.

The RAID software/firmware layer 104 provides fault tolerance by spreading the data and parity information across multiple disks or planes. The compression/decompression layer 106 compresses data allowing for efficient and faster access of storage medium. The deduplication layer 108 generally generates signatures using hash functions for each command that a host issues to the storage device. The deduplication layer 108 detects duplication by comparing the current generated signature with the maintained ones. In one implementation, the deduplication layer 108 maps the duplicate blocks from the various linear addresses to the same physical address, reducing the number of writes to storage and using the storage space more efficiently. The file system layer 112 provides abstraction for storing, retrieving and updating files on the storage device. Additionally, the file system manages access to data and metadata of the files and available space on the device. The OS interface layer 114 provides the application layer 116 a standardized interface for interacting with the storage device by calling function calls enabled by the OS interface layer 114.

In addition to their primary roles discussed above, all of the layers of the storage stack also perform additional house-keeping routines, such as maintaining memory, management functions, caching, linear to physical address mapping, garbage collection and journaling of states for protection against catastrophic events. Many of these functions are also performed in the HDD/SDD (102 and 132). Garbage collection may refer to the releasing of memory/storage resources no longer needed by the layer. Journaling may refer to logging state before committing the state in state machine. In the event of a catastrophic event, such as a system crash or a power failure, journaling may enable the system to recover faster and avoid corruption of system state.

Many of these house-keeping routines are duplicated in each layer of the storage stack, since these house-keeping routines performed by each layer are dedicated to that specific layer and isolated from the other layers because of the segmented architecture causing significant memory, processing and performance overhead.

Furthermore, for an application from the application layer 116 to communicate with the storage device 102, the message (containing data) must pass through seven segmented layers, as shown in FIG. 1, causing duplicated journaling, mapping, compression, caching and garbage collection functions. The passing of the data message through multiple layers also requires a number of encapsulation and de-encapsulation steps that also generates significant overhead.

The interface between each layer also creates bottlenecks. Moreover, the interface abstracts away details and allows for only limited visibility to the next layer below and beyond, requiring duplication of functions in the software stack, such as compression and journaling of state. For example, the file system layer 112, the Snapshots/clones thin provisioning layer 110 and the deduplication layer may all implement compression algorithms. However, once data is compressed there is very little benefit in repeatedly compressing data, resulting in wasted resources, in terms of latency and performance. Therefore, duplication of functions results in processing and memory overhead considerably dragging down the performance of the system.

Each layer also manages its own mapping structures and algorithms to translate the message from one layer to another. Mapping operations are expensive operations, increasing latency of data operations and degrading the performance of the system even further.

Moreover, the storage stack layers are developed by different vendors and adhere to various standard bodies. Every layer is developed in isolation from the other layers in the storage stack software vastly repeating the same functionality in different manifestations significantly increasing the probability of bugs in the system. Additionally, the storage stack layered approach hampers innovation in the product line, since any innovation that disturbs the interfaces between the different layers goes through a complex negotiation process with the various stake holders, such as the vendors for the different layers in the software stack. Furthermore, the performance degradation has a multiplicative in the layered architecture further exasperating performance issues.

Figure 2:
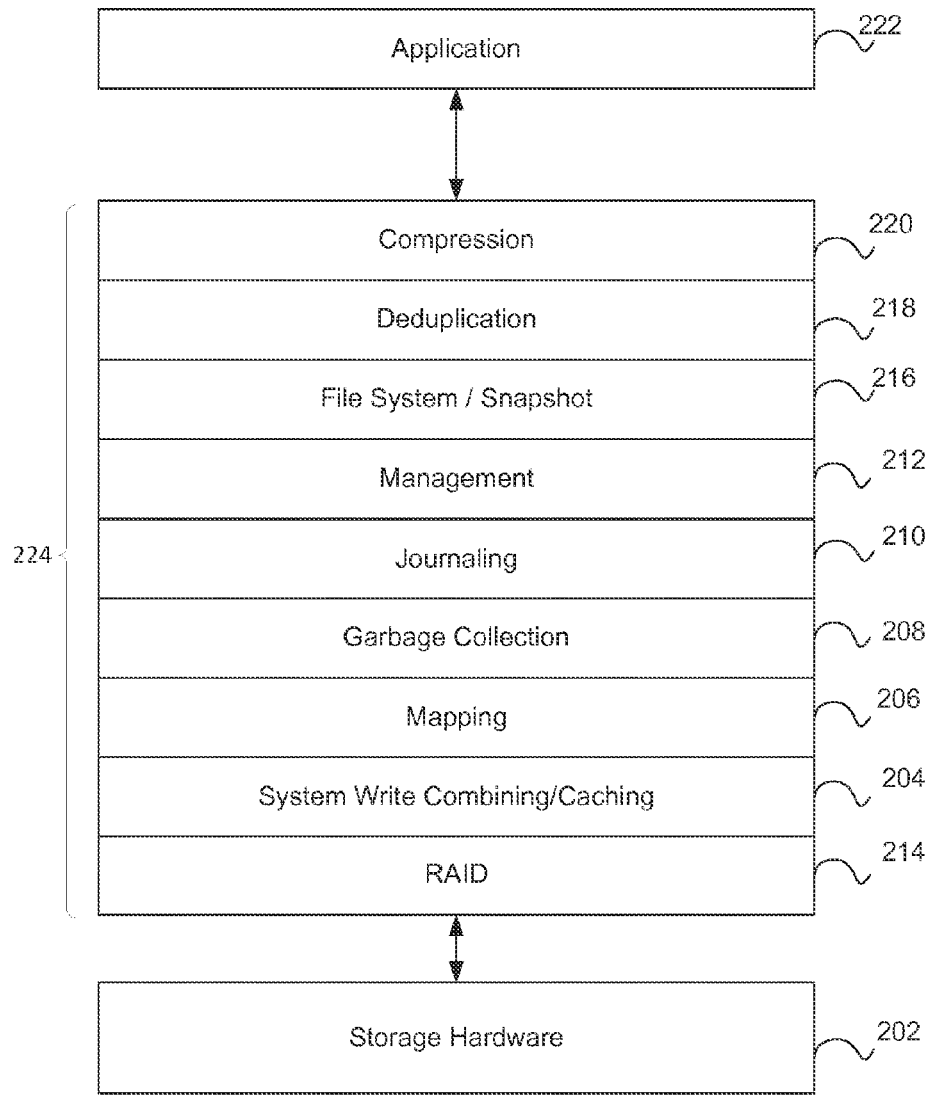
FIG. 2 illustrates a simplified diagram of a vertically integrated approach for accessing storage hardware.

FIG. 2 illustrates a simplified diagram of a vertically integrated approach for accessing storage hardware, according to embodiments of the invention.

Vertically integrating the various functionalities of the multiple layers by implementing the functionalities into a single or fewer layers significantly increases the ability of the system to provide reliability, robustness and fault tolerance functions, while improving storage capacity, power consumption, and latency of the overall system.

According to certain embodiments of the invention, the storage device may be implemented using non-volatile memory. Example implementations of non-volatile memory based devices may include, but are not limited to, using NOR, NAND, MRAM (Magnetoresistive RAM), FRAM (Ferroelectric RAM, RRAM (Resistive RAM)), phase change memory or any other suitable technology. NOR flash may provide high-speed random access and reading and writing data in specific memory locations such as up to a single byte. NAND flash may read randomly but typically is written sequentially at high speed, handling data in small blocks called pages. NAND flash may read faster than it writes, quickly transferring whole pages of data. NOR flash may behave in the same way except that reads may be faster than NAND flash and writes may be slower. Generally, less expensive than NOR flash at high densities, NAND technology may offer higher capacity for the same-size silicon.

In some implementations, embodiments of the invention may utilize a single-level cell (SLC) NAND flash technology. In other implementations, embodiments of the invention may utilize a Multi-Level Cell (MLC) NAND flash storage medium. MLC NAND is a flash memory technology using multiple levels per cell to allow more bits to be stored using the same number of transistors. In SLC NAND flash technology, each cell can exist in one of two states, storing one bit of information per cell. Most MLC NAND flash memory technologies have four possible states per cell, so it can store two bits of information per cell. Using MLC NAND may be advantageous for reducing the cost of per unit of storage due to the higher data density.

In certain embodiments of the invention, the system hardware, such as the non-volatile memory is integrated with the vertically integrated system, therefore integrating the hardware and software solutions. In contrast to prior art systems, in certain embodiments of the invention, the non-volatile memory is not implemented as part of several discrete black-box devices purchased off the shelf or from original equipment manufacturers (OEMs). Instead, certain embodiments of the invention describe developing a storage system from ground up where the storage hardware 202 is implemented as a single integrated system comprising non-volatile memory that is managed by a single software stack, comprising all the house-keeping functionality. In such a system only one instance of the house keeping functions, such as management, journaling, garbage collection, mapping, and system write combining/caching may be needed for managing all of the non-volatile memory in the storage device.

The user interface at the application 222 is significantly simplified and integrated, providing the user with an integrated view of the system hardware and software and knobs/hooks for globally managing all functions.

For compression 220, the integrated approach allows for a single compression operation for each transaction, improving performance and effectiveness of the system, while storing data. This is in contrast to FIG. 1, where the compression algorithm is run in up to five or more different layers (file system layer 112, snapshot layer 110 and deduplication layer 108 and the compression layer 108) repeatedly with little to no additional benefit, since compressed data cannot be compressed much further. Block 220 may also perform decompression of data, when data is accessed from the storage medium.

Deduplication 218 functionality may use a dedup table, mapping table, garbage collection, and journaling for performing deduplication. In one implementation, the integrated approach discussed in this disclosure allows the deduplication functionality to reuse the shared garbage collection 208, mapping tables 204, journaling 210 and garbage collection 208. In some instances, the garbage collection 208, mapping tables 204, journaling 210 and garbage collection 208 functionality is implemented in storage firmware (or FTL). Furthermore, in one implementation, the signature generation for deduplication may be, fully or partially, performed at the same time data is compressed by the compression module 220.

A vertically integrated implementation of the deduplication 218 functionality, as an example, demonstrates the value of an integrated approach. Generally, deduplication 108 functions by generating signatures using efficient hashing techniques for groups of data. The signatures are usually stored in a dedup table and/or mapping structure maintained by the deduplication unit 108. In one implementation, for access requests for storing data, the storage device may use the same efficient hashing technique on the data to be stored and generate a signature. The signature for the data associated with the store request may be matched against the signatures of groups of data already residing on the storage device using the dedup or/and mapping table. Matching of the signatures may indicate that the storage device already has a copy of the data matching the data to be stored on the storage device, therefore detecting the potential duplication of data. The storage device may instead of storing the duplicate data, may update the dedup table or/and the mapping structure to point to the duplicate data, therefore avoiding expensive write cycles. On read access request, the mapping structure may appropriately route the access request for reading the data to the appropriately stored data.

Figure 3:
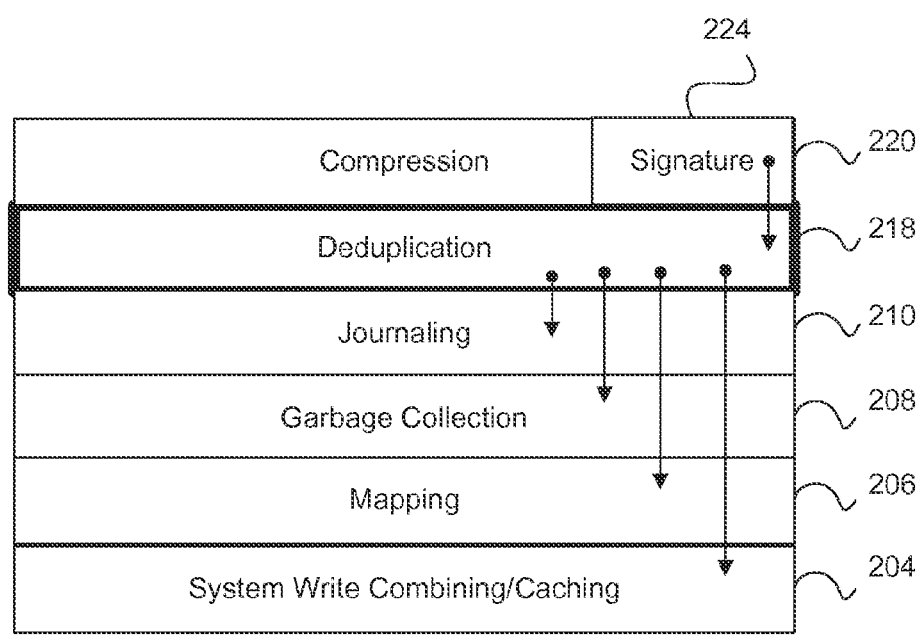
FIG. 3 illustrates the deduplication module that leverages the common functionality provided by the integrated system.

Traditionally to perform this function, data must be processed, on a byte or very small granularity, to generate the signature for deduplication. FIG. 3 shows how the deduplication module 218 opportunistically shares the common and optimized functionality provided by the integrated system. In a vertically integrated system, embodiments of the invention may advantageously generate the signatures (as shown by block 224) in the compression 220 module, at the same time data is being compressed. This is advantageous over the prior art techniques, since compression already processes the data once on a very small granularity to compress the data. Instead of reprocessing the data again for deduplication for generating signatures again, the signatures can be generated at the same time as compressing the data. In the prior art, such integration of steps is not possible since compression and duplication are performed using different segmented layers provided by different vendors and data is processed at least twice or many times, separately for the compression and deduplication functionality. Embodiments of the invention, by reducing the required processing, speed up the access request and also save power in the process.

Furthermore, maintaining of the dedup tables and/or mapping tables for deduplicating data may be performed by the mapping module 206. In some embodiments, this may further save space and reduce the number of accesses to the underlying non-volatile medium by consolidating all the accesses using a single mapping structure. Non-volatile memory is generally susceptible to rapid wear as compared to the traditional hard drives and reducing the number of accesses for non-volatile memory is important, since it reduces wear of the storage medium and increases the life of the storage device. Moreover, for power failure, the deduplication module can use the journaling 210 functionality provided for the integrated system. Similarly, for garbage collection and system write combining/caching, in FIG. 3, the deduplication may use the mapping 206 and system write combining/caching 204 functionality.

Similarly, a single management functionality 212 may manage the various functionalities throughout the vertically integrated stack for storage. In one implementation, the management functionality provides the interface for managing the various functionalities (204-220) throughout the vertically integrated stack for storage, such as providing the user with controllability of the features, collection of diagnosis data and providing interface for performing remedial and maintenance tasks.

Mapping 206 functionality provides the logical address to the physical address translations. In one implementation of the integrated approach, components of the device 400 enable collapsing of the mapping for the different functionality using a single multidimensional mapping structure. For example, individually, the file system uses a 2-dimensional mapping and the snapshot functionality uses a 2-dimensional mapping. These two mapping structures may be collapsed into a single 3-dimensional mapping structure. For example, one dimension of the multidimensional mapping structure may be represented by the File System ID and a second dimension may be represented by a snapshot version. Furthermore, as discussed with respect to deduplication 218, other system functionalities may also consolidate their mapping needs within the same mapping 206 functionality. This may be advantageous since the mapping tables are large and multiple reads to the mapping tables results in multiple data accesses to the storage medium increasing the wear of the storage disk and adversely impacting the latency of the read. For instance, in contrast to FIG. 2, in FIG. 1 a transaction from the application layer may invoke a separate mapping structure from almost every layer it traverses down the stack creating multiple accesses to the underlying hardware. In one implementation of the embodiments, the mapping is provided in the firmware layer.

The integrated approach also allows for a novel implementation of RAID 214 with equivalent/similar robustness and availability characteristics to RAID 6. Traditionally, RAID-5 requires two writes for each write and RAID-6 requires three writes for each write, each operating using the logical addresses for the access requests. The multiple writes wears down the storage medium, especially non-volatile memory based storage devices and also decreases performance of the system. In contrast, the integrated approach enables the novel RAID implementation 214 to operate using physical addresses instead of logical address allowing full stride writes sequentially without Read Modified Write operations, resulting in a performance boost while also reducing wear on the flash products. In certain implementation, the integrated approach enables RAID 214 to operate using physical addresses after the mapping 206 is performed, since the mapping no longer is segmented and hidden in a black box implementation of an HDD or SDD, allowing for such enhancements to the RAID 214 implementation.

In some implementation, house-keeping functions, such as garbage collection 208, journaling 210 and mapping 206 may be performed only once for the various different functionalities, shown in FIG. 2, therefore significantly reducing the overhead. For instance, in contrast to FIG. 2, in FIG. 1, journaling is performed at multiple levels of the stack since each level is architected independently and cannot rely on the journaling capabilities of another layer. As described with respect to FIG. 2, in an integrated approach, journaling is performed only once at a higher level to protect the state of the device against catastrophic events.

In some implementations, the functionality provided by the different blocks (204-220) shown in FIG. 2 are provided by a single integrated module 224. It should be noted that the sequence of the functions and/or modules shown in FIG. 2 is non-limiting and the functions and/or modules may be implemented in any sequence, without departing from scope of the invention.

In some implementation, some of the functions are stored as executable code/binary as firmware executable code in the storage hardware 202, and are executed using one or more Application Specific Integrated Circuits (ASIC), Field Programmable Gate Array (FPGA), or processing units. For instance, in one implementation, the garbage collection and mapping may be performed by firmware. In one implementation, the various functionalities described in FIG. 2 are integrated into a single executable binary or executable code, stored on a storage medium and executed after loading into memory. In another implementation, the various functionalities from FIG. 2, although integrated may be loaded as modules of an executable codebase, such as a kernel. Some modules may be loaded on a per-need basis, whereas other modules may stay persistent in memory. In yet another implementation, the vertically integrated modules may be stored in separate locations in the device and may be run separately, but may execute in an integrated manner. For example, the compression functionality, deduplication functionality and the file system functionality may be implemented in software stored on the storage medium and run on a processor, whereas the mapping functionality may be stored on the firmware flash and executed on a FPGA.

In one implementation, the system of FIG. 2 may be implemented in an enterprise environment for providing access to large amounts of storage. In one implementation, the storage hardware 202 may comprise non-volatile memory. In one implementation, an array of non-volatile memory is used in implementing the storage hardware 202. In another implementation, a large number of multi-level-cell flash chips, single level cell flash chips or any other suitable storage medium may be used in implementing the storage hardware 202 of FIG. 2.

Vertically integrating the functionality, as described in FIG. 2, has several advantages. Vertically integrating the various functionalities of the multiple layers into a single layer significantly increases the ability of the system to provide reliability, robustness and fault tolerance functions while improving storage capacity, power consumption, and latency of the overall system. As described, embodiments of the invention, reduce/remove the interface bottlenecks between the various layers, reduce duplication of functionality in different layers that provide little or no added benefit, and reduce the footprint of the executable code. Many of these advantages result in more efficient use of processing power and electrical power, and also result in much lower access latencies for the storage device.

Furthermore, by reducing duplication of functionality and also tightly integrating the functionality of several modules, the number of accesses to the non-volatile memory may be significantly reduced. The importance of reducing accesses to the memory is further pronounced for non-volatile memory storage systems, since non-volatile memory is generally more susceptible to wear due to repetitive access as compared to the traditional hard drives.

As described, modules described in FIG. 2 cannot be replaced with modules described in FIG. 1, since the modules in FIG. 1 require various house-keeping functionality such as journaling, caching, write combining, mapping, and garbage collection implemented within each segmented layer and do not allow inter module access to such resources. In addition, in prior art systems, not only can they not share resources such as journaling, caching, write combining, mapping, and garbage collection across layers, most higher layers of the storage device do not even have visibility to such features implemented inside the SSDs. The vice-versa is also true, wherein a module or layer from a prior art system of FIG. 1 cannot replace a module from embodiments of the invention, as described in FIG. 2.

Other advantages may include rapid development time, increased ability to integrate innovation and reduced number of bugs in the system.

Figure 4:
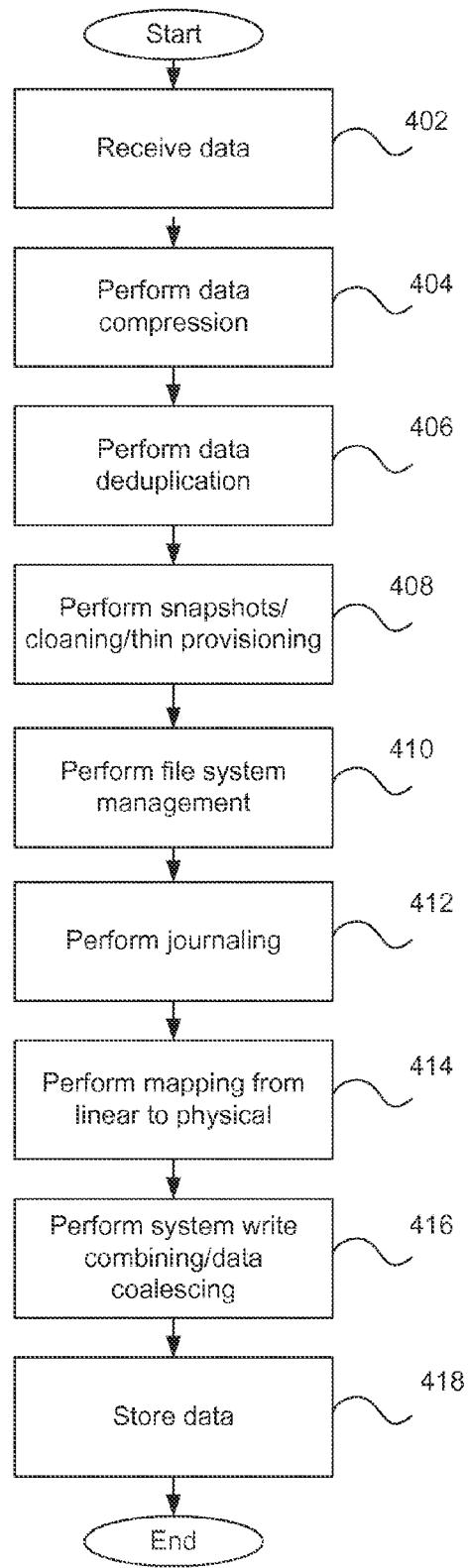
FIG. 4 illustrates an example flow diagram for performing embodiments of the invention.

FIG. 4 is a flow diagram, illustrating a method for accessing and storing data. The signaling in method 400 is performed by processing logic that comprises hardware (circuitry, dedicated logic, etc.), software (such as is run on a general purpose computing system or a dedicated machine), firmware (embedded software), or any combination thereof. In one embodiment, the method 400 is performed by one or more computer systems 500 as described in FIG. 5.

At block 402, components of the device 500, receive data for storing on the storage medium. At block 404, components of the device 500, perform data compression on the received data. In one implementation, the compression algorithm may be performed only once between receiving data and storing the data on the storage medium. At block 406, the data is deduplicated, as discussed in FIG. 2. Deduplication of data may use unified procedures for garbage collection and mapping provided by the firmware. At block, components of the device 500, may perform snapshots/cloning and/or thin provisioning of the data. At block 410, components of the device 500 may perform file system management tasks. At block 412, components of the device 500, may perform journaling of the system state for performing the store operation. Journaling functions may be provided only once in the software layers. At block 414, components of the device 500 may perform linear to physical translations for storing the data on the storage medium. At block 416, components of the device 500 may perform system write combining and/or data coalescing. At block 418, components of the device 500 may store the processed data on the storage medium. Although, not shown, in certain embodiments, the data may be spread across the storage medium using RAID techniques before storing the data. Embodiments of the invention allow for RAID operations using the physical address of the access request rather than the logical addresses, resulting in reduced number of writes.

It should be appreciated that the steps described above are for storing data on the storage medium. However, accessing data from the storage medium also may traverse through the same or similar steps in reverse order and perform reverse functionality in some instances. For example, the mapping functionality 414 for the access request maps a linear to physical, however, the compression block 402, performs decompression of data instead of compression for accessing data instead of storing data.

It should be appreciated that the specific steps illustrated in FIG. 4 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the method 400.

Figure 5:
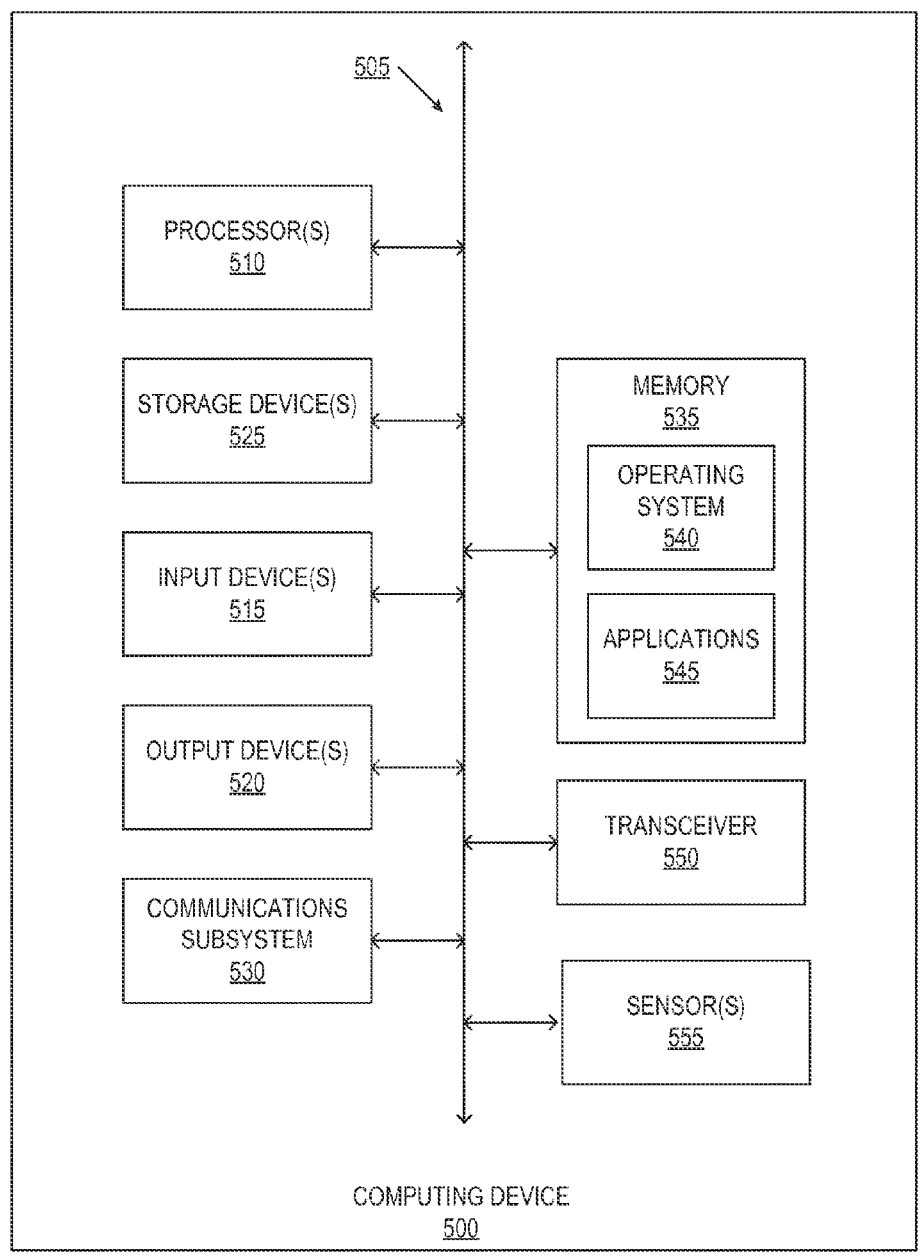
FIG. 5 illustrates an example of a computing system in which one or more embodiments may be implemented.

Having described multiple aspects of the vertically integrated architecture, an example of a computing system in which various aspects of the disclosure may be implemented may now be described with respect to FIG. 5. According to one or more aspects, a computer system as illustrated in FIG. 5 may be incorporated as part of a computing device, which may implement, perform, and/or execute any and/or all of the features, methods, and/or method steps described herein. For example, computer system 500 may represent some of the components of a device and/or access point apparatus. A device may be any computing device with a wireless unit, such as an RF receiver. In one embodiment, the system 500 is configured to implement any of the methods described herein. FIG. 5 provides a schematic illustration of one embodiment of a computer system 500 that can perform the methods provided by various other embodiments. FIG. 5 is meant only to provide a generalized illustration of various components, any and/or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include one or more processors 510, including without limitation one or more general-purpose processors and/or one or more special-purpose processors (such as digital signal processing chips, graphics acceleration processors, and/or the like); one or more input devices 515, which can include without limitation a camera, a mouse, a keyboard and/or the like; and one or more output devices 520, which can include without limitation a display unit, a printer and/or the like. The computing device 500 may also include a sensor(s), such as temperature sensors, power sensors, etc. for monitoring health of the system.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. In some embodiments, the storage may be implemented using non-volatile memory. Such storage devices may be configured to implement any appropriate data storage, including without limitation, various file systems, database structures, and/or the like.

The computer system 500 might also include a communications subsystem 530, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 530 may permit data to be exchanged with a network (such as the network described below, to name one example), other computer systems, and/or any other devices described herein. In many embodiments, the computer system 500 may further comprise a non-transitory working memory 535, which can include a RAM or ROM device, as described above. The computer system 500 might also include a transceiver 1050 for facilitating communication by the communications subsystem 530 with the external entities.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 525 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 500) to perform methods in accordance with the disclosure. For example, some or all of the procedures of the described methods may be performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the storage device(s) 525. Merely by way of example, execution of the sequences of instructions contained in the working memory 535 might cause the processor(s) 510 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processor(s) 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 525. Volatile media include, without limitation, dynamic memory, such as the working memory 535. Transmission media include, without limitation, coaxial cables, copper wire and fiber optics, including the wires that comprise the bus 505, as well as the various components of the communications subsystem 530 (and/or the media by which the communications subsystem 530 provides communication with other devices). Hence, transmission media can also take the form of waves (including without limitation radio, acoustic and/or light waves, such as those generated during radio-wave and infrared data communications).

Some embodiments may employ a computer system (such as the processor 510) to perform methods in accordance with the disclosure. For example, some or all of the procedures of the described methods may be performed by the viewing apparatus in response to the processor executing one or more sequences of one or more instructions (which might be incorporated into an operating system and/or other code, such as an application program) contained in working memory. Such instructions may be read into the working memory from another computer-readable medium, such as one or more of the storage device(s). Merely by way of example, execution of the sequences of instructions contained in the working memory might cause the processor(s) to perform one or more procedures of the methods described herein.

Again, embodiments employing computer systems described herein are not limited to being physically connected to the viewing apparatus. Processing may occur in another apparatus, connected via wire or wirelessly to the viewing apparatus. For example, a processor in a phone or instructions for executing commands by a phone or tablet may be included in these descriptions. Similarly, a network in a remote location may house a processor and send data to the viewing apparatus.

The terms "machine-readable medium" and "computer-readable medium," as used herein, refer to any medium that participates in providing data that causes a machine to operate in a specific fashion. In an embodiment implemented using the processor 510, various computer-readable media might be involved in providing instructions/code to processor(s) 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks. Volatile media include, without limitation, dynamic memory, such as flash memory or DDR3 RAM. Transmission media include, without limitation, coaxial cables, copper wire and fiber optics, as well as the various components of a communications subsystem (and/or the media by which the communications subsystem provides communication with other devices). Hence, transmission media can also take the form of waves (including without limitation radio, acoustic and/or light waves, such as those generated during radio-wave and infrared data communications).

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. "Data storage media" as used herein refers to manufactures and does not refer to transitory propagating signals. By way of example, and not limitation, such computer-readable media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware stored on computer-readable media.

Various examples have been described. These and other examples are within the scope of the following claims.

What is claimed is:

1. A storage device comprising:
    a storage medium comprising non-volatile memory;
    one or more processing entities configured to:
        execute a compression module to compress data associated with an access request, wherein the compression module is configured to generate a signature for the data;
        execute a deduplication module to detect duplicity of the data by comparing the signature generated by the compression module with signatures stored on the storage device;
        execute a journaling module to perform a journaling function for the access request, wherein the journaling function comprises logging data for data recovery in an event of a system crash or power failure;
        execute a mapping module to perform a mapping function for the access request, wherein the mapping function performs a translation from a linear address to a physical address for the access request using a multidimensional mapping structure, wherein a first dimension of the multidimensional mapping structure is a file identifier and a second dimension of the multidimensional mapping structure is a snapshot version;
        execute a Redundant Array of Independent Disks (RAID) module to provide fault tolerance by spreading data and parity information across the non-volatile memory; and
        execute a snapshot and thin provisioning module, wherein the snapshot and thin provisioning module does not have a separate journaling functionality or separate mapping functionality;
        wherein the journaling function is performed once for the deduplication module and the RAID module for the access request; and
        wherein the mapping function is performed once for the deduplication module and the RAID module for the access request.

2. The storage device of claim 1, wherein a flash translation layer (FTL) module comprises the journaling module and the mapping module.

3. The storage device of claim 2, wherein storage device is configured to execute a single instance of the FTL module for the storage device.

4. The storage device of claim 1, wherein the compression module is configured for compressing data before storing the data on the storage medium and decompressing the data after retrieving the data from the storage medium, wherein the compression module does not have a separate journaling functionality or separate mapping functionality.

5. The storage device of claim 1, wherein the one or more processing units are further configured to execute a File System (FS) module for providing abstraction to an application for storing, retrieving and updating files comprising data on the storage medium, wherein the FS module does not have a separate journaling functionality or separate mapping functionality.

6. The storage device of claim 1, wherein the one or more processing units are further configured to execute an Operating System (OS) module configured to execute on one or more processors, wherein OS module does not have a separate journaling functionality or separate mapping functionality.

7. The storage device of claim 1, wherein the one or more processing units are further configured to perform a caching function using a caching module only once for the deduplication module and the RAID module for the access request to the storage medium on the storage device.

8. The storage device of claim 1, wherein the one or more processing units are further configured to perform a garbage collection function using a garbage collection module only once for the deduplication module and the RAID module for the access request to the storage medium on the storage device.

9. A non-transitory computer readable storage medium, wherein the non-transitory computer readable storage medium comprises instructions executable by a processor, the instructions comprising instructions to:
    manage access to a non-volatile memory for the storage medium using a Flash Translation Layer (FTL) module;
    compress data associated with an access request using a compression module, and generate a signature for the data using the compression module;
    detect duplicity of the data using a deduplication module by comparing the signature generated by the compression module with stored signatures;
    perform a journaling function using a journaling module for the access request, wherein the journaling function comprises logging data for data recovery in an event of a system crash or power failure;
    perform a mapping function using a mapping module for the access request, wherein the mapping function performs a translation from a linear address to a physical address for the access request using a multidimensional mapping structure, wherein a first dimension of the multidimensional mapping structure is a file identifier and a second dimension of the multidimensional mapping structure is a snapshot version;
    provide fault tolerance by spreading data and parity information across the non-volatile memory using a Redundant Array of Independent Disks (RAID) module; and
    perform a snapshot and thin provisioning function, wherein the snapshot and thin provisioning function does not have a separate journaling functionality or separate mapping functionality;
    wherein the journaling function is performed once for the FTL module, the deduplication module and the RAID module for the access request to the storage medium on the storage device; and
    wherein the mapping function is performed once for the FTL module, the deduplication module and the RAID module for the access request.

10. The non-transitory computer readable storage medium of claim 1, wherein the instructions are part of a single executable binary.

11. The non-transitory computer readable storage medium of claim 1, further comprising instructions to decompress data only once for a read access request.

12. The non-transitory computer readable storage medium of claim 1, further comprising instructions to perform caching function only once for the access request to the storage medium on the storage device.

13. The non-transitory computer readable storage medium of claim 1, further comprising instructions to perform garbage collection functionality only once for the access request to the storage medium on the storage device.

14. A method for accessing a storage medium on a storage device, the method comprising:
   managing access to a non-volatile memory for the storage medium using a Flash Translation Layer (FTL) module;
   compressing data associated with an access request using a compression module, and generating a signature for the data using the compression module;
   detecting duplicity of data using a deduplication module by comparing the signature generated by the compression module with stored signatures;
   performing a journaling function using a journaling module for the access request, wherein the journaling function comprises logging data for data recovery in an event of a system crash or power failure;
   performing a mapping function using a mapping module for the access request, wherein the mapping function performs a translation from a linear address to a physical address for the access request using a multidimensional mapping structure, wherein a first dimension of the multidimensional mapping structure is a file identifier and a second dimension of the multidimensional mapping structure is a snapshot version;
   providing fault tolerance by spreading data and parity information across the non-volatile memory using a Redundant Array of Independent Disks (RAID) module; and
   performing a snapshot and thin provisioning function, wherein the snapshot and thin provisioning function does not have a separate journaling functionality or separate mapping functionality;
   wherein the journaling function is performed once for the access request; and
   wherein the mapping function is performed once for the access request.

15. The method of claim 14, further comprising decompressing data once for a read access request.

16. The method of claim 14, further comprising performing caching only once for the access request to the storage medium on the storage device.

17. The method of claim 14, further comprising performing garbage collection functionality only once for the access request to the storage medium on the storage device.

18. The method of claim 14, further comprising performing garbage write combining only once for the access request to the storage medium on the storage device.

* * * * *